United States Patent
Campbell et al.

(10) Patent No.: US 11,180,133 B2
(45) Date of Patent: Nov. 23, 2021

(54) HYBRID-VEHICLE SYSTEM

(71) Applicant: BorgWarner Inc., Auburn Hills, MI (US)

(72) Inventors: Michael W. Campbell, Royal Oak, MI (US); Calahan B. Campton, Royal Oak, MI (US)

(73) Assignee: Borg Warner Inc., Auburn Hills, MI (US)

( * ) Notice: Subject to any disclaimer, the term of this patent is extended or adjusted under 35 U.S.C. 154(b) by 0 days.

(21) Appl. No.: 16/788,887

(22) Filed: Feb. 12, 2020

(65) Prior Publication Data

US 2021/0245729 A1 Aug. 12, 2021

(51) Int. Cl.
*B60W 20/40* (2016.01)
*B60W 10/02* (2006.01)
(Continued)

(52) U.S. Cl.
CPC .............. *B60W 20/40* (2013.01); *B60K 6/38* (2013.01); *B60W 10/02* (2013.01); *F16D 41/04* (2013.01);
(Continued)

(58) Field of Classification Search
None
See application file for complete search history.

(56) References Cited

U.S. PATENT DOCUMENTS 7,998,023 B2 * 8/2011 Holmes ................ B60W 10/30 477/5
8,226,516 B2 7/2012 Swales et al.
(Continued)

FOREIGN PATENT DOCUMENTS

DE 102013008071 A1 11/2014
DE 102016012472 A1 4/2018
(Continued)

OTHER PUBLICATIONS

Machine-Assisted English language abstract for DE 10 2013 008 071 extracted from espacenet.com database on Mar. 12, 2020, 2 pages.
(Continued)

*Primary Examiner* — Dirk Wright
(74) *Attorney, Agent, or Firm* — Howard & Howard Attorneys PLLC (57) ABSTRACT

A hybrid-vehicle system includes an internal combustion engine configured to deliver a first rotational torque to a crankshaft. The first rotational torque is a maximum torque deliverable by the internal combustion engine. The hybrid-vehicle system also includes a transmission selectively rotatably coupled to the crankshaft, and an assembly including an electric machine rotatably coupled to the transmission and configured to deliver a second rotational torque directly to the transmission. The assembly also includes a one-way clutch configured to rotationally couple the crankshaft and the transmission. The assembly further includes a friction clutch moveable between an engaged state where the crankshaft and the transmission are rotationally coupled, and a disengaged state where the crankshaft and the transmission are rotationally decoupled. In the engaged state, the friction clutch is limited to delivering 85% or less of the first rotational torque to the transmission.

19 Claims, 4 Drawing Sheets

(51) Int. Cl.
  *B60K 6/38* (2007.10)
  *F16D 41/04* (2006.01)
  *B60K 6/387* (2007.10)
  *F16D 47/04* (2006.01)
  *B60K 6/383* (2007.10)

(52) U.S. Cl.
  CPC .............. *B60K 6/383* (2013.01); *B60K 6/387* (2013.01); *B60W 2510/0275* (2013.01); *F16D 47/04* (2013.01)

(56) References Cited

U.S. PATENT DOCUMENTS

| | | | |
|---|---|---|---|
| 8,876,655 B2 | 11/2014 | Schoenek et al. | |
| 9,079,485 B2* | 7/2015 | Duan | B60W 20/40 |
| 9,132,834 B2* | 9/2015 | Ideshio | B60K 6/48 |
| 9,709,147 B2 | 7/2017 | Steinberger et al. | |
| 9,790,999 B2 | 10/2017 | Veit et al. | |
| 9,856,925 B2* | 1/2018 | Maier | B60K 6/48 |
| 10,183,570 B2* | 1/2019 | Kimes | B60K 6/365 |
| 10,428,880 B2* | 10/2019 | Trinkenschuh | F16D 27/112 |
| 10,458,491 B2* | 10/2019 | Trinkenschuh | F16D 41/04 |
| 10,781,869 B2* | 9/2020 | Finkenzeller | F16D 13/52 |
| 10,858,008 B2* | 12/2020 | Yamada | B60W 20/15 |
| 2014/0094341 A1* | 4/2014 | Ruder | B60K 6/383 477/5 |
| 2019/0128338 A1 | 5/2019 | Wolk et al. | |

FOREIGN PATENT DOCUMENTS

| | | |
|---|---|---|
| DE | 102017001844 A1 | 8/2018 |
| WO | 2016172079 A1 | 10/2016 |

OTHER PUBLICATIONS

Machine-Assisted English translation for DE 10 2016 012 472 extracted from the espacenet.com database on Mar. 13, 2020, 16 pages.

Machine-Assisted English language abstract and Machine-Assisted English language translation for DE 10 2017 001 844 extracted from espacenet.com database on Mar. 13, 2020, 15 pages.

U.S. Appl. No. 16/788,962, filed Feb. 12, 2020.

* cited by examiner

FIG. 2B

HYBRID-VEHICLE SYSTEM

BACKGROUND OF THE INVENTION

1. Field of the Invention

The invention generally relates to a hybrid-vehicle system and a method for controlling an assembly for a hybrid-vehicle system.

2. Description of the Related Art

Hybrid-vehicle systems for vehicles include an internal combustion engine and an electric motor. In these hybrid-vehicle systems, both the internal combustion engine and the electric motor are capable of delivering torque to wheels of the vehicle to propel the vehicle. Commonly, the internal combustion engine and the electric motor are capable of delivering the torque to a transmission which, in turn, delivers the torque to the wheels of the vehicle. Hybrid-vehicle systems also commonly include an assembly to selectively transmit the torque from the internal combustion engine and/or the electric motor to the transmission.

The assemblies common to hybrid-vehicle systems typically include a clutch moveable between engaged and disengaged states to selectively transmit the torque from the internal combustion engine and/or the electric motor to the transmission. The clutch typically is a one-way clutch or a friction clutch. In assemblies that have a one-way clutch, the engagement and disengagement of the clutch to selectively transmit the torque from the internal combustion engine and/or the electric motor results in rough transmission of the torque to the transmission, potentially damaging the assembly, the internal combustion engine, and/or the electric motor, and producing a rough driving experience of the vehicle. Additionally, in assemblies that have a friction clutch, the friction clutch must be sized to be very large to transmit the entire torque from the internal combustion engine and/or the electric motor to the transmission, thus increasing the size, cost, and heat generation in the assembly.

As such, there remains a need to provide an improved assembly for a hybrid-vehicle system.

SUMMARY OF THE INVENTION AND ADVANTAGES

A hybrid-vehicle system for a vehicle is disclosed. The hybrid-vehicle system includes an internal combustion engine including a crankshaft. The internal combustion engine is configured to deliver a first rotational torque to the crankshaft. The first rotational torque is a maximum torque deliverable by the internal combustion engine. The hybrid-vehicle system also includes a transmission selectively rotatably coupled to the crankshaft of the internal combustion engine. The hybrid-vehicle system further includes an assembly.

The assembly includes an electric machine rotatably coupled to the transmission, and the electric machine is configured to deliver a second rotational torque directly to the transmission in conjunction with the first rotational torque from the internal combustion engine or independent of the first rotational torque from the internal combustion engine. The assembly also includes a one-way clutch coupled to the crankshaft, and the one-way clutch is configured to rotatably couple the crankshaft and the transmission to selectively deliver rotational torque from the crankshaft through the one-way clutch to the transmission. The assembly further includes a friction clutch coupled to the crankshaft, and the friction clutch is moveable between an engaged state and a disengaged state.

When the friction clutch is in the engaged state, the crankshaft and the transmission are rotationally coupled to selectively deliver a portion of the first rotational torque from the crankshaft through the friction clutch to the transmission. When the friction clutch is in the disengaged state, the crankshaft and the transmission are rotationally decoupled and the first rotational torque from the crankshaft is not transmitted through the friction clutch. In the engaged state, the friction clutch is limited to delivering 85% or less of the first rotational torque to the transmission.

The movement of the friction clutch between the engaged and disengaged states to rotationally couple and selectively deliver a portion of the first rotational torque from the crankshaft through the friction clutch to the transmission is optimally accomplished due to the ability of the friction clutch to smoothly engage and disengage. Thus, the friction clutch prevents damage to the assembly, the internal combustion engine, and/or the electric machine during engagement of the friction clutch. The friction clutch also produces a smooth driving experience of the vehicle. The friction clutch is also sized such that the friction clutch is limited to delivering 85% or less of the first rotational torque to the transmission in the engaged state, thus decreasing the size of the assembly, lowering the cost of the assembly, and limiting the heat generation caused by the friction clutch in the assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

With reference to the Figures, wherein like numerals indicate like parts throughout the several views, a hybrid-vehicle system 10 for a vehicle is shown schematically in FIGS. 1A-2B. The hybrid-vehicle system 10 includes an internal combustion engine 12 including a crankshaft 14. The internal combustion engine 12 is configured to deliver a first rotational torque to the crankshaft 14. The first rotational torque is a maximum torque deliverable by the internal combustion engine 12.

The internal combustion engine 12 has a cylinder and a piston disposed in the cylinder. During operation of the internal combustion engine 12, the piston is moved by combustion in the cylinder, which then rotates the crankshaft 14 and delivers a torque to the crankshaft 14. The hybrid-vehicle system 10 also includes a transmission 16 selectively rotatably coupled to the crankshaft 14 of the internal combustion engine 12. The hybrid-vehicle system 10 further includes an assembly 18.

The assembly 18 includes an electric machine 20 rotatably coupled to the transmission 16, and the electric machine 20 is configured to deliver a second rotational torque directly to the transmission 16 in conjunction with the first rotational torque from the internal combustion engine 12, or independent of the first rotational torque from the internal combustion engine 12. Although not required, the electric machine 20 may be an electric motor configured to convert electrical energy into rotational energy and torque, and/or may be an electric generator configured to convert rotational energy and torque into electrical energy. The assembly 18 also includes a one-way clutch 22 coupled to the crankshaft 14. The one-way clutch 22 is configured to rotationally couple the crankshaft 14 and the transmission 16 to selectively deliver rotational torque from the crankshaft 14 through the one-way clutch 22 to the transmission 16. The assembly 18 further includes a friction clutch 24 coupled to the crankshaft 14. The friction clutch 24 is moveable between an engaged state and a disengaged state.

Figure 1A:
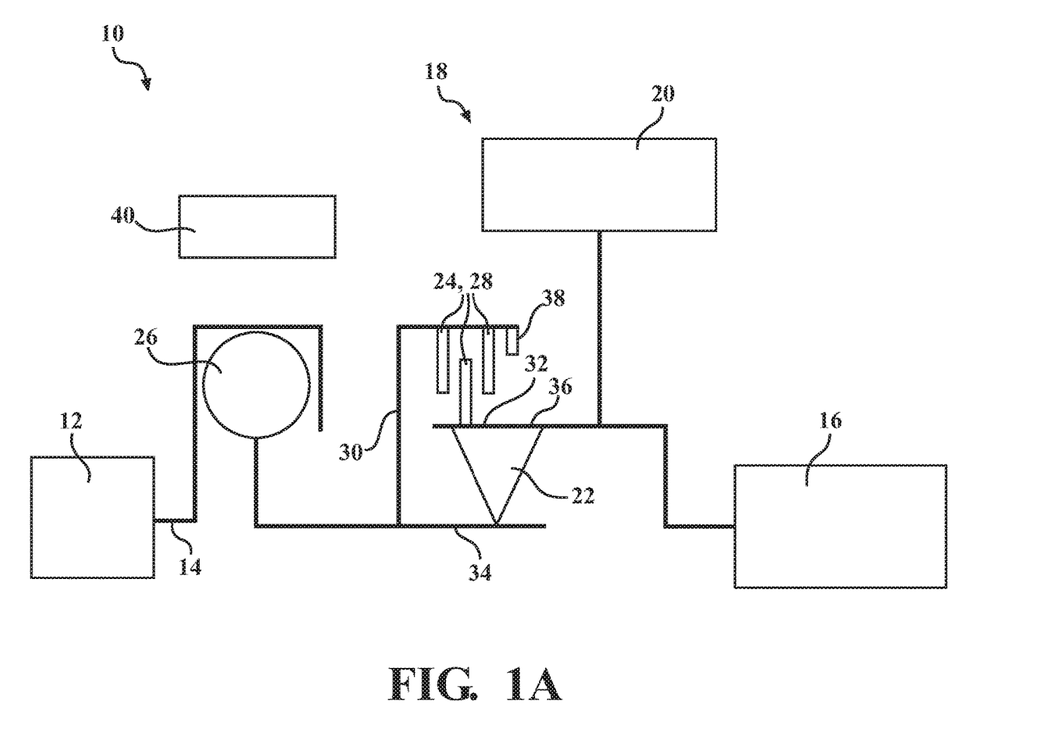
FIG. 1A is a schematic illustration of a hybrid-vehicle system having an internal combustion engine, an electric machine, a transmission, a friction clutch in a disengaged state, and a one-way clutch.
Figure 1B:
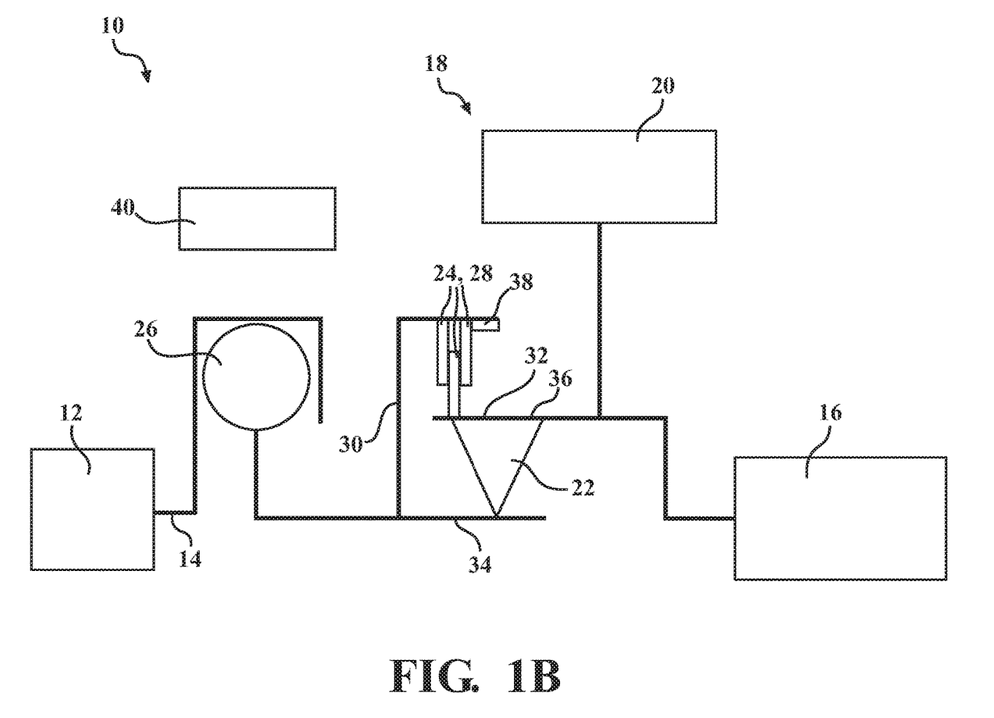
FIG. 1B is a schematic illustration of the hybrid-vehicle system, with the friction clutch in an engaged state.
Figure 2A:
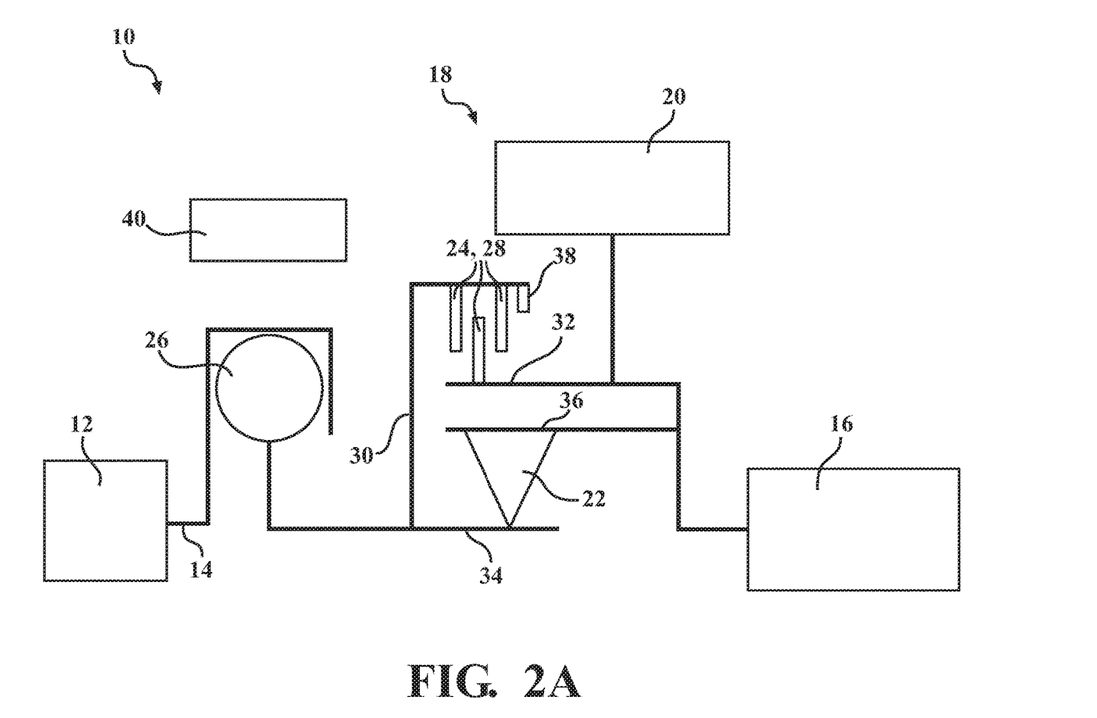
FIG. 2A is a schematic illustration of the hybrid-vehicle system, with the friction clutch in the disengaged state, and with the one-way clutch having a one-way clutch output that is rotationally coupled to the transmission without being rotationally coupled to the electric machine.
Figure 2B:
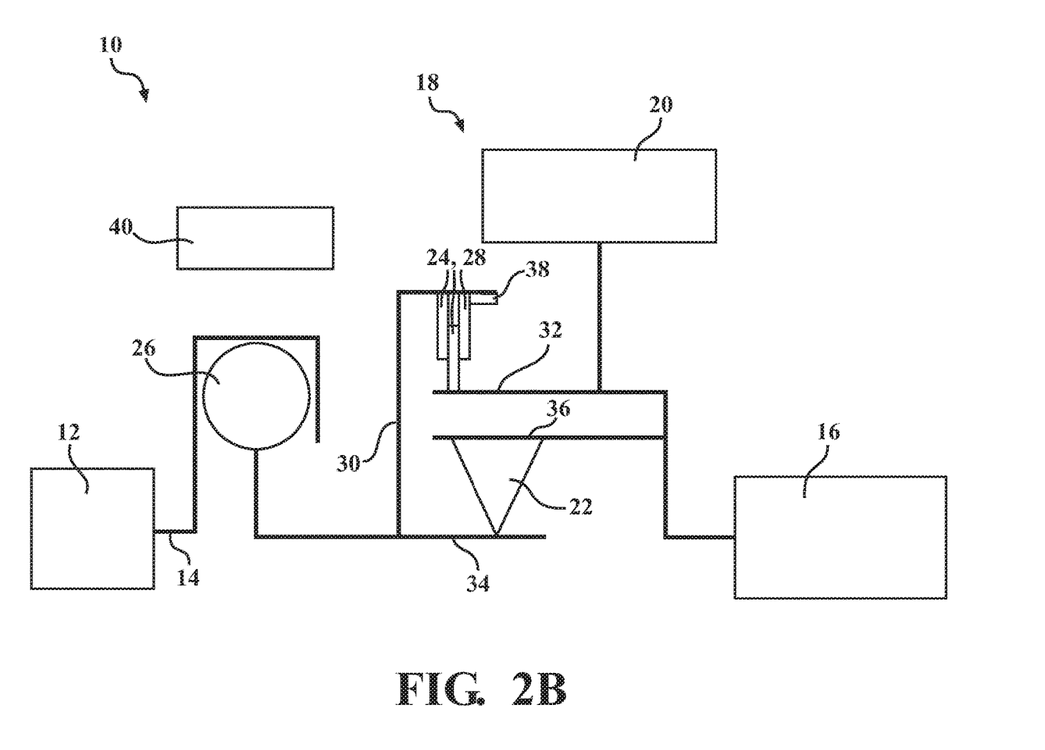
FIG. 2B is a schematic illustration of the hybrid-vehicle system, with the friction clutch in the engaged state.

When the friction clutch 24 is in the engaged state, as shown in FIGS. 1A and 2A, the crankshaft 14 and the transmission 16 are rotationally coupled to selectively deliver a portion of the first rotational torque from the crankshaft 14 through the friction clutch 24 to the transmission 16. When the friction clutch 24 is in the disengaged state, as shown in FIGS. 1B and 2B, the crankshaft 14 and the transmission 16 are rotationally decoupled and the first rotational torque from the crankshaft 14 is not transmitted through the friction clutch 24. In the engaged state, the friction clutch 24 is limited to delivering 85% or less of the first rotational torque to the transmission 16.

The movement of the friction clutch 24 between the engaged and disengaged states to rotationally couple and selectively deliver a portion of the first rotational torque from the crankshaft 14 through the friction clutch 24 to the transmission 16 is optimally accomplished due to the ability of the friction clutch 24 to smoothly engage and disengage. The friction clutch 24 is able to smoothly engage and disengage because the friction clutch 24 has at least one friction plate able to partially engage while moving between the disengaged and engaged states. Partial engagement of the friction plate prevents abrupt transmission of the torque from the crankshaft 14 to the transmission 16. Thus, the friction clutch 24 prevents damage to the assembly 18, the internal combustion engine 12, and/or the electric machine 20 during engagement of the friction clutch 24. The friction clutch 24 also produces a smooth driving experience of the vehicle. The friction clutch 24 is also sized such that the friction clutch 24 is limited to delivering 85% or less of the first rotational torque to the transmission 16, thus decreasing the size of the assembly 18, lowering the cost of the assembly 18, and limiting the heat generation caused by the friction clutch 24 in the assembly 18.

The friction clutch 24 and the one-way clutch 22 are disposed in parallel with one another. Said differently, the torque from the crankshaft 14 may be delivered through the friction clutch 24 to the transmission 16, the torque from the crankshaft 14 may be delivered through the one-way clutch 22 to the transmission 16, or the torque from the crankshaft 14 may be delivered through both the friction clutch 24 and the one-way clutch 22 to the transmission 16.

During start-up of the internal combustion engine 12, the crankshaft 14 begins rotating at a rotational speed. During start-up of the internal combustion engine 12, the electric machine 20 may be required to supplement the torque delivered by the crankshaft 14 of the internal combustion engine 12. For the electric machine 20 to supplement the torque delivered by the crankshaft 14 of the internal combustion engine 12, the electric machine must be synchronized with the rotational speed of the crankshaft 14. To synchronize the rotational speed of the crankshaft 14 and the electric machine 20, the friction clutch 24 may be moved from the disengaged state to the engaged state to smoothly rotational couple the crankshaft 14 and the electric machine 20. The friction clutch 24 is able to synchronize the rotation of the crankshaft 14 and the electric machine 20 without aid from any external devices.

After the friction clutch 24 is in the engaged state and the rotation of the crankshaft 14 and the electric machine 20 are synchronized, the one-way clutch 22 may be moved from the disengaged state to the engaged state to provide additional capacity to deliver the torque from the internal combustion engine 12 to the transmission 16. Because the rotational speed of the crankshaft 14 and the electric machine 20 are already synchronized and the crankshaft 14 and the electric machine 20 are already rotationally coupled, the engagement of the one-way clutch 22 can be accomplished without rough transmission of the torque to the transmission 16, avoiding potential damage to the assembly 18, the internal combustion engine 12, and/or the electric machine 20.

It is to be appreciated that the crankshaft 14 and the electric machine 20 are not required to be at the same rotational speed relative to one another to move the one-way clutch 22 from the disengaged state to the engaged state. As the friction clutch 24 is engaged, a differential in rotational speed between the crankshaft 14 and the electric machine 20 is decreased. This decrease in the differential in rotational speed between the crankshaft 14 and the electric machine 20 may also allow the one-way clutch 22 to be moved to the engaged state without rough transmission of the torque to the transmission 16, and may also avoid potential damage to the assembly 18, the internal combustion engine 12, and/or the electric machine 20.

After the one-way clutch 22 is moved from the disengaged state to the engaged state, the friction clutch 24 may be moved from the engaged state to the disengaged state to reduce power consumption of the hybrid-vehicle system 10. More specifically, the hybrid-vehicle system 10 may include a pump to hydraulically actuate the friction clutch 24 to hold the friction clutch 24 in the engaged state, may include a solenoid to electrically actuate the friction clutch 24 to hold the friction clutch 24 in the engaged state, or may include an electric motor and, optionally, a gear, a lever, ramp, or a series of gears, levers, and/or ramps to change the torque ratio of the electric motor and to hold the friction clutch 24 in the engaged state. To move the friction clutch 24 from the engaged state to the disengaged state, the pump, solenoid, and/or electric motor are turned off, thus reducing power consumption of the hybrid-vehicle system 10. Alternatively, the friction clutch 24 may remain in the engaged state to provide capacity beyond the capacity of the one-way clutch 22 to deliver the torque to the transmission 16.

Beyond propelling the vehicle, the friction clutch 24 while in the engaged state may allow negative torque transmission from the internal combustion engine 12. Negative torque transmission is transmission of torque in an opposite rotational direction as typical during operation of the internal combustion engine 12 (e.g. counterclockwise if normally clockwise, or clockwise if normally counterclockwise). The negative torque transmission may be used to slow the vehicle without the aid of external brakes. Without the friction clutch 24 allowing the negative torque transmission, the one-way clutch 22 would overrun.

The hybrid-vehicle system 10 may also include a damper 26 coupled to the crankshaft 14 of the internal combustion engine 12 and both the friction clutch 24 and the one-way clutch 22 of the assembly 18. The damper 26 may be, but is not limited to, a harmonic damper, a centrifugal pendulum absorber, or a dual mass flywheel. The hybrid-vehicle system 10 may further include a transmission launch device coupled to the transmission 16 and to both the friction clutch 24 and the one-way clutch 22. The transmission launch device may be, but is not limited to, a torque converter or a launch clutch.

Although not required, in one embodiment, the friction clutch 24 in the engaged state is limited to delivering 70% or less of the first rotational torque to the transmission 16. It is to be appreciated that the friction clutch 24 may be limited to delivering 50% or less of the first rotational torque to the transmission 16, may be limited to delivering 40% or less of the first rotational torque to the transmission 16, may be limited to delivering 30% or less of the first rotational torque to the transmission 16, and/or may be limited to delivering 20% or less of the first rotational torque to the transmission 16.

The particular percentage of the first rotational torque at which the friction clutch 24 is limited to delivering may be determined by, but is not limited to, the torque from the internal combustion engine 12 between start-up of the internal combustion engine 12 and the torque at which the rotational speed of the crankshaft 14 and the electric machine 20 are synchronized. This torque is typically less than the first rotational torque, which is the maximum torque deliverable by the internal combustion engine 12.

In some embodiments, the one-way clutch 22 is configured to deliver at least 100% of the first rotational torque from the crankshaft 14 to the transmission 16. In the embodiments where the one-way clutch 22 is configured to deliver at least 100% of the first rotational torque from the crankshaft 14 to the transmission 16, the one-way clutch 22 is able to be in an engaged state during steady-state operation of the internal combustion engine 12 while the friction clutch 24 is in the disengaged state while not limiting the amount of the first rotational torque able to be delivered to the transmission 16. In other words, in these embodiments, the one-way clutch 22 is able to deliver all of the first rotational torque from the internal combustion engine 12 to the transmission 16 without assistance from the friction clutch 24. It is to be appreciated that the one-way clutch 22 may be configured to deliver more than the first rotational torque to the transmission 16. Said differently, the one-way clutch 22 may be over-sized such that a safety margin exists to ensure that all of the first rotational torque may be delivered by the one-way clutch 22.

Alternatively, the one-way clutch 22 may be configured to deliver less than 100% of the first rotational torque from the crankshaft 14 to the transmission 16. In this embodiment, the one-way clutch 22 in combination with the friction clutch 24 is required to deliver the first rotational torque from the internal combustion engine 12 to the transmission 16. Said differently, both the one-way clutch 22 and the friction clutch 24 must be in the engaged state to deliver all of the first rotational torque to the transmission 16 in this embodiment.

In some embodiments, in the engaged state, the friction clutch 24 and the one-way clutch 22 are together configured to deliver from 90 to 185% of the first rotational torque from the crankshaft 14 to the transmission 16. In other embodiments, in the engaged state, the friction clutch 24 and the one-way clutch 22 are together configured to deliver from 95 to 120% of the first rotational torque from the crankshaft 14 to the transmission 16. In these embodiments, the friction clutch 24 and the one-way clutch 22 may be both in the engaged state to deliver all of the first rotational torque to the transmission 16. It is to be appreciated that this range is merely exemplary. For example, the friction clutch 24 and the one-way clutch 22 may be together configured to deliver less than 90%, or may be together configured to deliver more than 185%, of the first rotational torque to the transmission 16.

In the embodiments where the friction clutch 24 and the one-way clutch 22 are together configured to deliver over 100% of the first rotational torque to the transmission 16, an additional percentage over 100% is the safety margin that exists to ensure that all of the first rotational torque is able to be delivered to the transmission 16. The factors that determine the safety margin (i.e., the amount of the additional percentage over 100%) include, but are not limited to, the absolute amount of the first rotational torque and the ability of the one-way clutch 22 and the friction clutch 24 to deliver torque relative to one another.

In some embodiments, the friction clutch 24 is further defined as a latching friction clutch 28. The latching friction clutch 28 is able to remain in the engaged state without additional power consumption, such as hydraulic power consumption or electrical power consumption. As such, the latching friction clutch 28 results in low power consumption during steady-state operation of the internal combustion engine 12 without sacrificing delivery of the torque to the transmission 16. Additionally, the latching friction clutch 28 may allow the one-way clutch 22 to be configured to deliver less than 100% of the first rotational torque to the transmission 16 because the latching friction clutch 28 may deliver the portion of the first rotational torque from the crankshaft 14 through the latching friction clutch 28 to the transmission 16 without adversely affecting power consumption of the hybrid-vehicle system 10.

Typically, the latching friction clutch 28 has a latch 38 configured to prevent the latching friction clutch 28 from moving from the engaged state to the disengaged state. The latch 38 may be mechanical, such as a ball-and-spring detent, a pawl or rachet, a plug disposed in a fluid flow path defined in the friction clutch 24, a separator plate disposed between friction plates and configured to engage a housing or another plate to remain in the engaged state, or a hydraulic or electric piston coupled to the separator plate and/or the friction plates and configured to engage the housing or another plate to remain in the engaged state. Although not required, when the latch 38 is a ball-and-spring detent, the ball in the engaged state is disposed in one or more of a groove, recess, depression, indentation, or the like of the housing, the hydraulic or electric piston, the separator plate, or another plate.

The hybrid-vehicle system 10 may also include a controller 40 configured to change delivery of the first rotational torque to through the one-way clutch 22 to the transmission 16, from through the friction clutch 24 to the transmission 16. Said differently, the controller 40 changes delivery of the torque from the friction clutch 24 to the one-way clutch 22. The controller 40 may change delivery of the torque upon receiving sensory input of the torque being delivered from the internal combustion engine 12 through the crankshaft 14 to the friction clutch 24. It is to be appreciated that the controller 40 may also change delivery of the torque from the one-way clutch 22 to the friction clutch 24. In some embodiments, the controller 40 is configured to change delivery of the first rotational torque upon the internal combustion engine 12 reaching a predetermined operating condition. The predetermined operating condition may be, but is not limited to, a portion of the first rotational torque generated by the internal combustion engine 12, and a rotational speed of the crankshaft 14.

In some embodiments, as shown in FIGS. 1A-2B, the friction clutch 24 has a friction clutch input 30 that is rotationally coupled to the internal combustion engine 12, and a friction clutch output 32 that is rotationally coupled to the electric machine 20. The friction clutch input 30 and the friction clutch output 32 are rotationally decoupled when the friction clutch 24 is in the disengaged state, and the friction clutch input 30 and the friction clutch output 32 are rotationally coupled when the friction clutch 24 is in the engaged state.

In one embodiment, as shown in FIGS. 1A and 1B, the one-way clutch 22 has a one-way clutch input 34 that is rotationally coupled to the internal combustion engine 12, and a one-way clutch output 36 that is rotationally coupled to the electric machine 20. In this embodiment, the friction clutch output 32 and the one-way clutch output 36 may be rotationally coupled to one another. It is to be appreciated that the one-way clutch 22 may have a one-way clutch output 36 that is rotationally coupled to the transmission 16 without being rotationally coupled to the electric machine 20, as shown in FIGS. 2A and 2B. In this embodiment, the friction clutch output 32 and the one-way clutch output 36 may be rotationally decoupled from one another.

In one embodiment, the friction clutch input 30 and the one-way clutch input 34 are both rotationally coupled to the internal combustion engine 12, and the friction clutch output 32 and the one-way clutch output 36 are both rotationally coupled to the electric machine 20. In this embodiment, the first rotational torque may be delivered from the internal combustion engine 12 through either the friction clutch 24, the one-way clutch 22, or both the friction clutch 24 and the one-way clutch 22 to the transmission 16, and the electric machine 20 may deliver the second rotational torque directly to the transmission 16 in conjunction with the first rotational torque from the internal combustion engine 12.

A method for controlling the assembly 18 for the hybrid-vehicle system 10 includes the step of engaging the friction clutch 24. The step of engaging the friction clutch 24 is accomplished by moving the friction clutch 24 from the disengaged state to the engaged state. In the engaged state, the crankshaft 14 and the electric machine 20 are rotationally coupled to deliver 85% or less of the first rotational torque from the crankshaft 14 through the friction clutch 24 to the transmission 16. In the disengaged state, the crankshaft 14 and the electric machine 20 are rotationally decoupled and the first rotational torque from the crankshaft 14 is not transmitted through the friction clutch 24. The method also includes the step of engaging the one-way clutch 22 to rotationally couple the crankshaft 14 and the transmission 16 to deliver rotational torque from the crankshaft 14 through the one-way clutch 22 to the transmission 16.

The method may also include the step of disengaging the friction clutch 24 by moving the friction clutch 24 from the engaged state to the disengaged state. In this embodiment, the one-way clutch 22 may still be in the engaged state and the first rotational torque may be delivered from the internal combustion engine 12 to the transmission 16. In this embodiment, the hybrid-vehicle system 10 has reduced power consumption because the pump and/or solenoid are turned off.

The method may further include the step of delivering the second rotational torque via the electric machine 20 directly to the transmission 16. Delivering the second rotational torque directly to the transmission 16 more efficiently propels the vehicle without being hindered by a damper or additional componentry.

In some embodiments, the step of engaging the friction clutch 24 precedes the step of delivering the second rotational torque via the electric machine 20 directly to the transmission 16. In these embodiments, the second rotational torque may be supplemental to the first rotational torque from the internal combustion engine 12. Alternatively, in other embodiments, the step of delivering the second rotational torque via the electric machine 20 directly to the transmission 16 precedes the step of engaging the friction clutch 24. In these other embodiments, the electric machine 20 may be operated while the internal combustion engine 12 is not operating.

In some embodiments, the step of delivering the second rotational torque via the electric machine 20 directly to the transmission 16 precedes the step of engaging the one-way clutch 22. In these embodiments, the first rotational torque may be delivered from the internal combustion engine 12 through the friction clutch 24 in the engaged state to the transmission, and the electric machine 20 may supplement the first rotational torque by delivering the second rotational torque to the transmission 16. The delivery of the first and second rotational torques may be accomplished during start-up of the internal combustion engine 12 before the one-way clutch 22 is in the engaged state to deliver all of the first rotational torque to the transmission 16.

In some embodiments, the step of delivering the second rotational torque via the electric machine 20 precedes the step of disengaging the friction clutch 24. The friction clutch 24 may be disengaged during steady-state operation of the internal combustion engine 12 when the first rotational torque is being delivered from the internal combustion engine 12 through the one-way clutch 22 to the transmission 16. As such, the electric machine 20 may be required to deliver the second rotational torque during start-up of the internal combustion engine 12, which precedes the step of disengaging the friction clutch 24 during steady-state operation of the internal combustion engine 12.

The method may further include the step of delivering the first rotational torque from the internal combustion engine 12 to the transmission 16. The step of delivering the second rotational torque via the electric machine 20 directly to the transmission 16 may precede the step of delivering the first rotational torque from the internal combustion engine 12 to the transmission 16. In this embodiment, the internal combustion engine 12 is operated before the electric machine 20 is operated.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A hybrid-vehicle system comprising:
an internal combustion engine comprising a crankshaft, with said internal combustion engine being configured to deliver a rotational torque to said crankshaft, and with said internal combustion engine being configured to deliver a first rotational torque to said crankshaft, wherein said first rotational torque is further defined as being a maximum of said rotational torque that is deliverable by said internal combustion engine to said crankshaft;
a transmission rotatably coupled to said crankshaft of said internal combustion engine;
an assembly comprising,
an electric machine rotatably coupled to said transmission, said electric machine configured to deliver a second rotational torque directly to said transmission in conjunction with said rotational torque from said internal combustion engine or independent of said rotational torque from said internal combustion engine,
a one-way clutch coupled to said crankshaft, with said one-way clutch configured to rotationally couple said crankshaft and said transmission to deliver rotational torque from said crankshaft through said one-way clutch to said transmission, and
a friction clutch coupled to said crankshaft, with said friction clutch moveable between an engaged state where said crankshaft and said transmission are rotationally coupled to deliver said rotational torque from said crankshaft through said friction clutch to said transmission, and a disengaged state where said crankshaft and said transmission are rotationally decoupled and said rotational torque from said crankshaft is not transmitted through said friction clutch, wherein, in said engaged state, said friction clutch is limited to delivering 85% or less of said first rotational torque to said transmission; and
a controller configured to change delivery of said rotational torque from said internal combustion engine to said transmission between delivering said rotational torque from said internal combustion engine to said transmission exclusively through said one-way clutch, and delivering said rotational torque from said internal combustion engine to said transmission exclusively through said friction clutch.

2. The hybrid-vehicle system as set forth in claim 1, wherein, in said engaged state, said friction clutch is limited to delivering 70% or less of said rotational torque to said transmission.

3. The hybrid-vehicle system as set forth in claim 1, wherein said one-way clutch is configured to deliver at least 100% of said rotational torque from said crankshaft to said transmission.

4. The hybrid-vehicle system as set forth in claim 1, wherein, in said engaged state, said friction clutch and said one-way clutch are together configured to deliver from 90 to 185% of said rotational torque from said crankshaft to said transmission.

5. The hybrid-vehicle system as set forth in claim 1, wherein said friction clutch is further defined as a latching friction clutch.

6. The hybrid-vehicle system as set forth in claim 5, wherein said latching friction clutch has a latch configured to prevent said latching friction clutch from moving from said engaged state to said disengaged state.

7. The hybrid-vehicle system as set forth in claim 1, wherein said controller is configured to change delivery of said rotational torque upon said internal combustion engine reaching a predetermined operating condition.

8. The hybrid-vehicle system as set forth in claim 1, wherein said friction clutch has a friction clutch input that is rotationally coupled to said internal combustion engine, and a friction clutch output that is rotationally coupled to said electric machine.

9. The hybrid-vehicle system as set forth in claim 1, wherein said one-way clutch has a one-way clutch input that is rotationally coupled to said internal combustion engine, and a one-way clutch output that is rotationally coupled to said electric machine.

10. The hybrid-vehicle system as set forth in claim 1, wherein said friction clutch has friction clutch input and a friction clutch output, and said one-way clutch has one-way clutch input and a one-way clutch output, wherein said friction clutch input and said one-way clutch input are both rotationally coupled to said internal combustion engine, and wherein said friction clutch output and said one-way clutch output are both rotationally coupled to said electric machine.

11. A method for controlling an assembly for a hybrid-vehicle system, with the hybrid-vehicle system including,
an internal combustion engine including a crankshaft, with the internal combustion engine configured to deliver a rotational torque to the crankshaft, and with the internal combustion engine being configured to deliver a first rotational torque to the crankshaft, wherein the first rotational torque is further defined as being a maximum of said rotational torque that is deliverable by the internal combustion engine to the crankshaft,
a transmission adapted to be rotatably coupled to the crankshaft of the internal combustion engine,
an assembly including an electric machine rotatably coupled to the transmission, the electric machine configured to deliver a second rotational torque directly to the transmission in conjunction with the rotational torque from the internal combustion engine or independent of the rotational torque from the internal combustion engine, a one-way clutch coupled to the crankshaft, a friction clutch coupled to the crankshaft, and
a controller configured to change delivery of the rotational torque to the transmission between delivering the rotational torque to the transmission through the one-way clutch, and delivering the rotational torque to the transmission through the friction clutch, said method comprising the steps of:
utilizing the controller to change delivery of rotational torque by causing the engagement of the friction clutch by moving the friction clutch between an engaged state, where the crankshaft and the electric machine are rotationally coupled to deliver 85% or less of the rotational torque from the crankshaft exclusively through the friction clutch to the transmission, and a disengaged state, where the crankshaft and the electric machine are rotationally decoupled and the rotational torque from the crankshaft is not transmitted through the friction clutch to the transmission; and
utilizing the controller to change delivery of rotational torque by causing the engagement of the one-way clutch to rotationally couple the crankshaft and the transmission to deliver rotational torque from the crankshaft exclusively through the one-way clutch to the transmission.

12. The method as set forth in claim 11 further comprising the step of disengaging the friction clutch by moving the friction clutch from the engaged state to the disengaged state.

13. The method as set forth in claim 11 further comprising the step of delivering the second rotational torque via the electric machine directly to the transmission.

14. The method as set forth in claim 13, wherein the step of engaging the friction clutch precedes the step of delivering the second rotational torque via the electric machine directly to the transmission.

15. The method as set forth in claim 13, wherein the step of delivering the second rotational torque via the electric machine directly to the transmission precedes the step of engaging the one-way clutch.

16. The method as set forth in claim 11 further comprising the step of delivering the second rotational torque via the electric machine directly to the transmission, and the step of disengaging the friction clutch by moving the friction clutch from the engaged state to the disengaged state, wherein the step of delivering the second rotational torque via the electric machine precedes the step of disengaging the friction clutch.

17. The method as set forth in claim 13 further comprising the step of delivering the rotational torque from the internal combustion engine to the transmission, and wherein the step of delivering the second rotational torque via the electric machine directly to the transmission precedes the step of delivering the rotational torque from the internal combustion engine to the transmission.

18. An assembly for use in a hybrid-vehicle system, with the hybrid-vehicle system including an internal combustion engine including a crankshaft, with the internal combustion engine configured to deliver a rotational torque to the crankshaft, and with the internal combustion engine being configured to deliver a first rotational torque to the crankshaft, wherein the rotational torque is further defined as being a maximum rotational torque that is deliverable by the internal combustion engine to the crankshaft, and a transmission adapted to be selectively rotatably coupled to the crankshaft for transmitting rotational torque via said assembly, said assembly comprising:

an electric machine adapted to be rotatably coupled to the transmission, said electric machine configured to deliver a second rotational torque directly to the transmission in conjunction with the rotational torque from the internal combustion engine or independent of the rotational torque from the internal combustion engine;

a one-way clutch coupled to the crankshaft, with said one-way clutch configured to rotationally couple the crankshaft and the transmission to deliver rotational torque from the crankshaft through said one-way clutch to the transmission; and a friction clutch adapted to be coupled to the crankshaft, with said friction clutch moveable between an engaged state where the crankshaft and the transmission are adapted to be rotationally coupled to deliver a portion of the first rotational torque from the crankshaft through said friction clutch to the transmission, and a disengaged state where the crankshaft and the transmission are adapted to be rotationally decoupled and the rotational torque from the crankshaft is not transmitted through said friction clutch, and wherein, in said engaged state, said friction clutch is limited to delivering 85% or less of the first rotational torque to the transmission, wherein said friction clutch is further defined as a latching friction clutch.

19. The assembly as set forth in claim 18, wherein said latching friction clutch has a latch configured to prevent said latching friction clutch from moving from said engaged state to said disengaged state.

\* \* \* \* \*